United States Patent [19]

Ashley et al.

[11] Patent Number: 4,501,722

[45] Date of Patent: Feb. 26, 1985

[54] ABSORPTION OF POLLUTANT MATERIAL FROM A POLLUTED GAS

[75] Inventors: Michael J. Ashley, Solihull, England; Paul D. Hemphill, Baytown; Charles C. Leivo, The Woodlands, both of Tex.

[73] Assignee: Dresser Industries, Inc., Dallas, Tex.

[21] Appl. No.: 468,270

[22] Filed: Feb. 18, 1983

[30] Foreign Application Priority Data

Feb. 25, 1982 [GB] United Kingdom ............... 8205581

[51] Int. Cl.$^3$ ............................................. C01B 17/00
[52] U.S. Cl. .................................. 423/242; 423/244; 55/73
[58] Field of Search .......... 423/242 A, 242 R, 244 A, 423/244 R; 55/73

[56] References Cited

U.S. PATENT DOCUMENTS 3,885,918 5/1975 Isahaya ........................... 55/257 X
4,269,812 5/1981 Edwards et al. .................... 423/242

FOREIGN PATENT DOCUMENTS 1333635 10/1973 United Kingdom .
2014975 5/1979 United Kingdom .
2021086 11/1979 United Kingdom .
2040271 8/1980 United Kingdom .
2084896 4/1982 United Kingdom .

OTHER PUBLICATIONS

"SO$_2$ Removal by Dry FGD"-Parsons et al., pp. 801–852.

Primary Examiner—Gregory A. Heller
Attorney, Agent, or Firm—Daniel Rubin

[57] ABSTRACT

In a method of absorbing pollutant material e.g. sulphur dioxide from a polluted gas, an aqueous suspension of a solid absorbent e.g. calcium hydroxide is sprayed into the gas; and the ambient conditions in the gas are such that all the water is evaporated and the absorption product is dried as it is formed. The spray droplet size is controlled to be a practical maximum consistent with maintaining the ambient conditions. The spray droplet size may be so controlled that the arithmetical average spray droplet lifetime is at least 80% of the theoretical maximum spray droplet lifetime consistent with maintaining the ambient conditions.

14 Claims, 10 Drawing

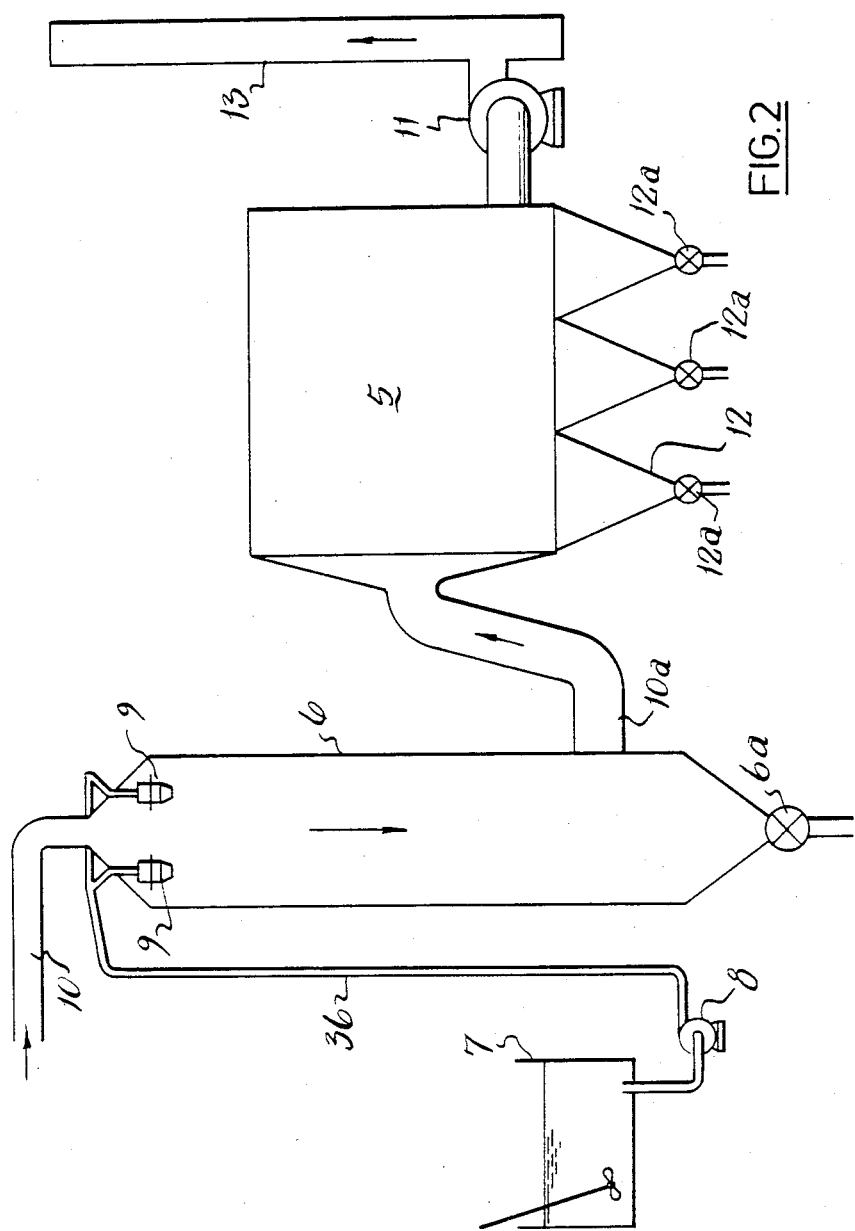

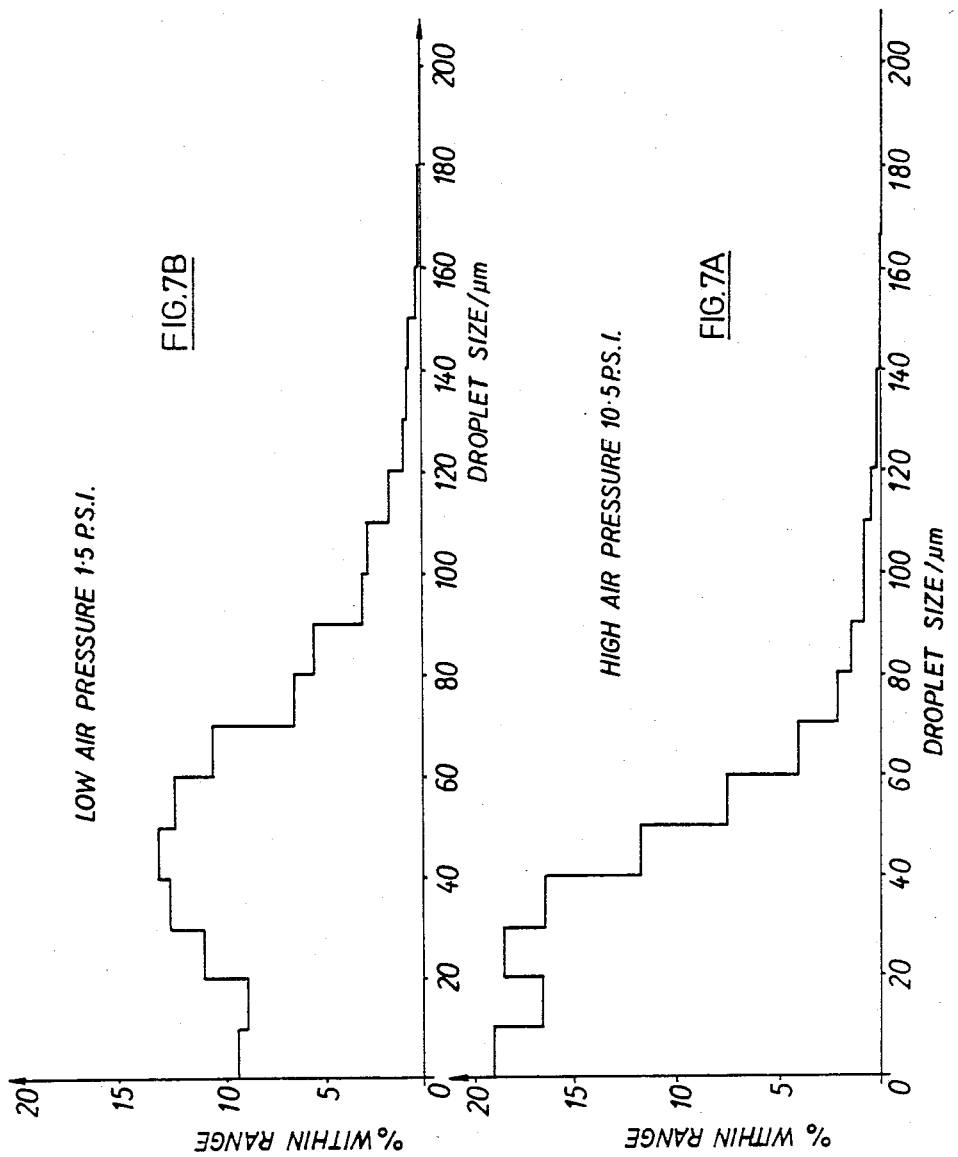

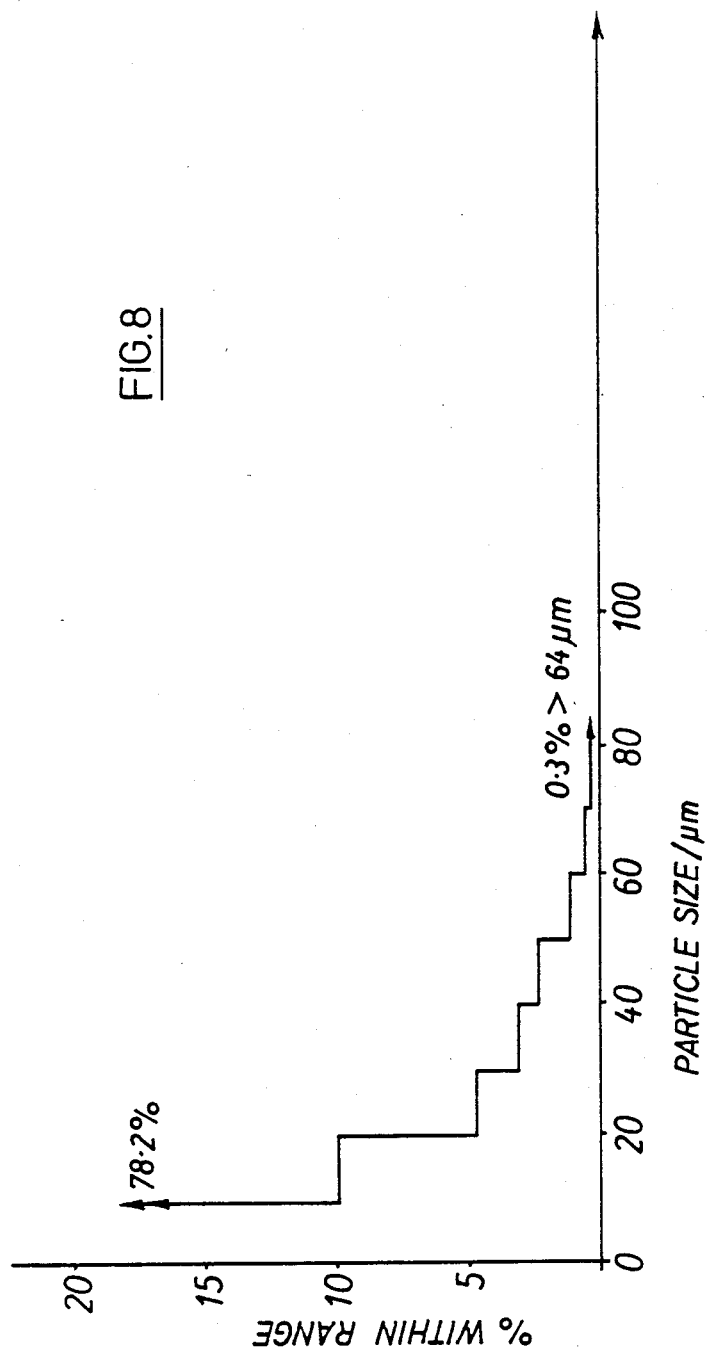

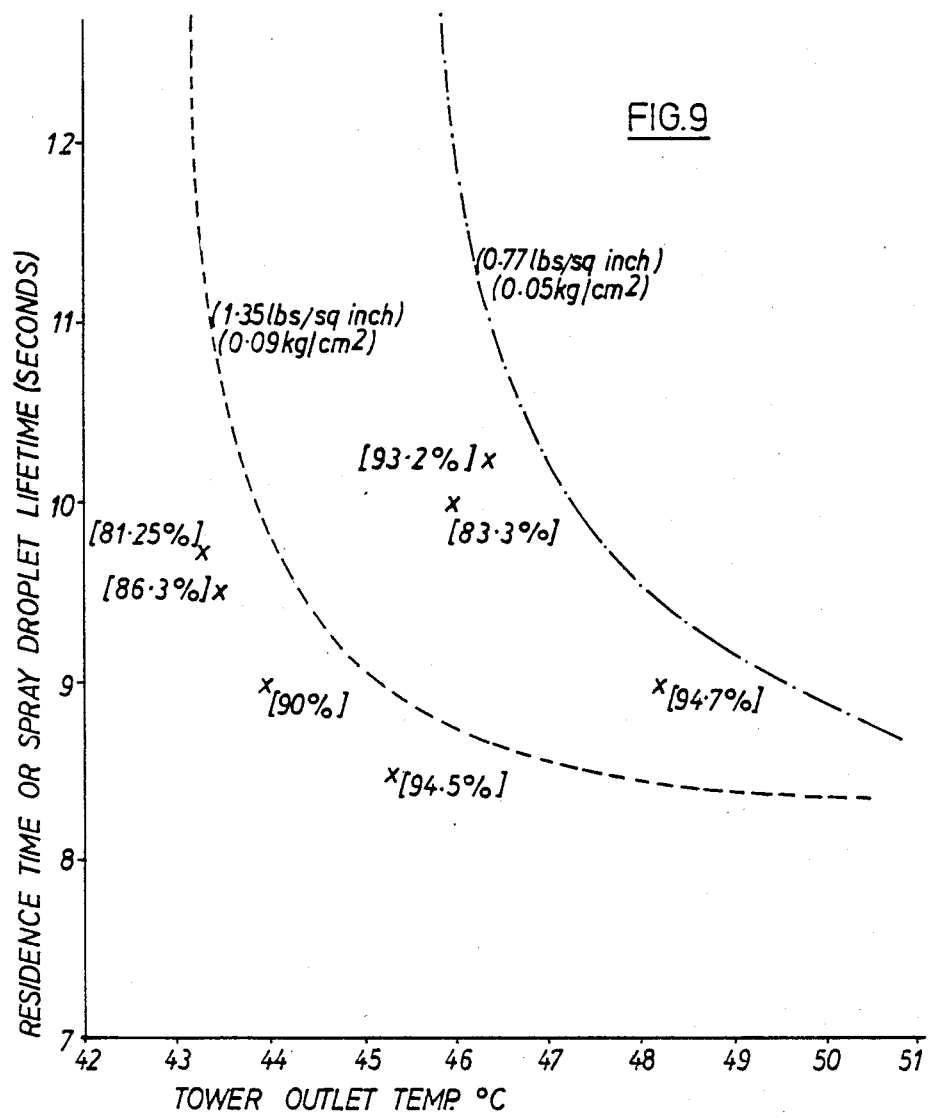

ABSORPTION OF POLLUTANT MATERIAL FROM A POLLUTED GAS

This invention is concerned with improvements in or relating to absorption of pollutant material from a polluted gas.

A known method of absorbing pollutant material from a polluted gas involves spraying into the gas an aqueous absorption solution, or an aqueous suspension of a solid absorbent, and controlling the ambient conditions in the gas such that all the water is evaporated and the absorption product is dried as it is formed. This method is effectively one of spray drying.

One example of this known absorption method involves the absorption of sulphur dioxide from a polluted gas by spraying into the gas an aqueous suspension of calcium hydroxide or calcium carbonate. As the sulphur dioxide is absorbed from the gas, the water evaporates from the spray droplets, leaving a dry powder comprising calcium sulphite. Usually some of the dry powder readily separates from the gas for immediate collection, but in any event the gas from the absorption step is usually passed through for example a bag filter or an electro-precipitator for further removal of particulate material including e.g. fly ash as well as the reacted absorbent, prior to release to the atmosphere.

It has been believed generally in the prior art that spray droplet size as such has had little effect on absorption efficiency, and that smaller spray droplets are to be preferred from the point of view of ease of maintaining the ambient conditions for total evaporation and drying. It is argued that the absorption of sulphur dioxide into an alkaline solution or suspension is controlled by gaseous diffusion processes, and that whether droplets are smaller or larger will have no effect on this process since the advantage of the larger available surface area afforded by smaller droplets is cancelled out by the shorter residence time due to the shorter life of the liquid droplets due to evaporation.

Surprisingly however we have found that in the case of aqueous suspensions e.g. of calcium hydroxide, larger droplet sizes in fact favour absorption efficiency.

We do not wish to be bound by theory, but our results lead us to believe that in the case of absorption into a suspended solid, the rate determining step may be the absorption of the pollutant from the liquid phase into the solid particles. Factors affecting this are the total surface area of the solid particles themselves and the time available for reaction. Thus the surface area of the droplets themselves will have no direct effect on the rate of absorption into the solid particles, but smaller droplets will mean faster evaporation, lower residence times and consequently less time available for the liquid/solid diffusion controlled process.

The invention provides a method of absorbing pollutant material from a polluted gas by spraying into the gas an aqueous suspension of a solid absorbent and wherein the ambient conditions in the gas are such that all the water is evaporated and the absorption product is dried as it is formed; characterised in that the spray droplet size is controlled to be a practical maximum consistent with maintaining such ambient conditions.

It will be realised that the lifetime of a spray droplet is dependent on its size, and the ambient conditions in the gas will not be maintained if the spray droplet lifetime exceeds the residence time of the gas in e.g. a spray tower; and the theoretical maximum lifetime consistent with maintaining the ambient conditions is equal to the residence time of the gas. It will also be realised that the practical maximum average spray droplet size must fall short of the theoretical maximum in order to allow a safety margin. A convenient parameter in this regard is the extent to which arithmetical average spray droplet lifetime approaches the theoretical maximum.

In a method according to the invention, the arithmetical average spray droplet lifetime is for example at least 80 or 85% of the theoretical maximum spray droplet lifetime consistent with maintaining said ambient conditions; but under carefully controlled conditions it may be possible to approach closer to the theoretical maximum e.g. up to 90%, 95% or even more.

The invention also provides a method of absorbing pollutant material from a polluted gas by spraying into the gas an aqueous suspension of a solid absorbent and wherein the ambient conditions in the gas are such that all the water is evaporated and the absorption product is dried as it is formed, characterised in that the spray droplet size is so controlled that the arithmetical average spray droplet lifetime is at least 85% of the theoretical maximum spray droplet lifetime consistent with maintaining said ambient conditions.

The spray may be formed in various ways, for example by a centrifugal disc atomiser as described for example in U.K. Patent Application Nos. 2,014,975A (Rockwell) or U.K. Patent Application No. 2,021,086A (Niro), but we prefer to use a rotating cup atomiser, as described hereinafter, and in our U.K. Patent Application No. 2,084,896A.

In the rotating cup atomiser, the cup is preferably rotated at a speed of for example 3000-6000 revolutions per minute.

There now follows a description, to be read with reference to the accompanying drawings, of a method embodying the invention. This description is given by way of example only and not by way of limitation of the invention.

In the accompanying drawings, FIGS. 1-6 correspond respectively to FIGS. 3-8 of our said U.K. Patent Application No. 2,084,896A and:

FIG. 2 shows, schematically, a practical arrangement for desulphurising flue gas;

FIG. 7A shows a spray droplet size spectrum for relatively small size droplets;

FIG. 7B shows a spray droplet size spectrum for larger size droplets;

FIG. 8 shows a calcium hydroxide particle size spectrum; and

FIG. 9 shows a graphical representation of spray droplet lifetime against tower outlet gas temperature.

In order to optimise the gas/liquid contact in spray drying it is preferable to use a tall thin tower in which the gas flow distribution is optimised. Such a tower is, however, incompatible with centrifugal disc atomisers, but we have found (U.K. Patent Application No. 2,084,896A) that rotary-cup atomisers can be used to produce a spray pattern with a low angle (as opposed to the 180° angle of centrifugal disc atomisers) which is particularly suitable for use with tall thin towers. Typically a tall thin tower has an internal height at least twice (preferably at least three times) its internal diameter; e.g. 20 ft. (6 meters) in height and 6 ft. (1.8 meters) in diameter would be typical; whereas a centrifugal-disc atomiser is used with towers some 18 ft. (5.5 meters) high and 14 ft. (4.3 meters) in diameter, or measurements in similar proportions.

Figure 1:
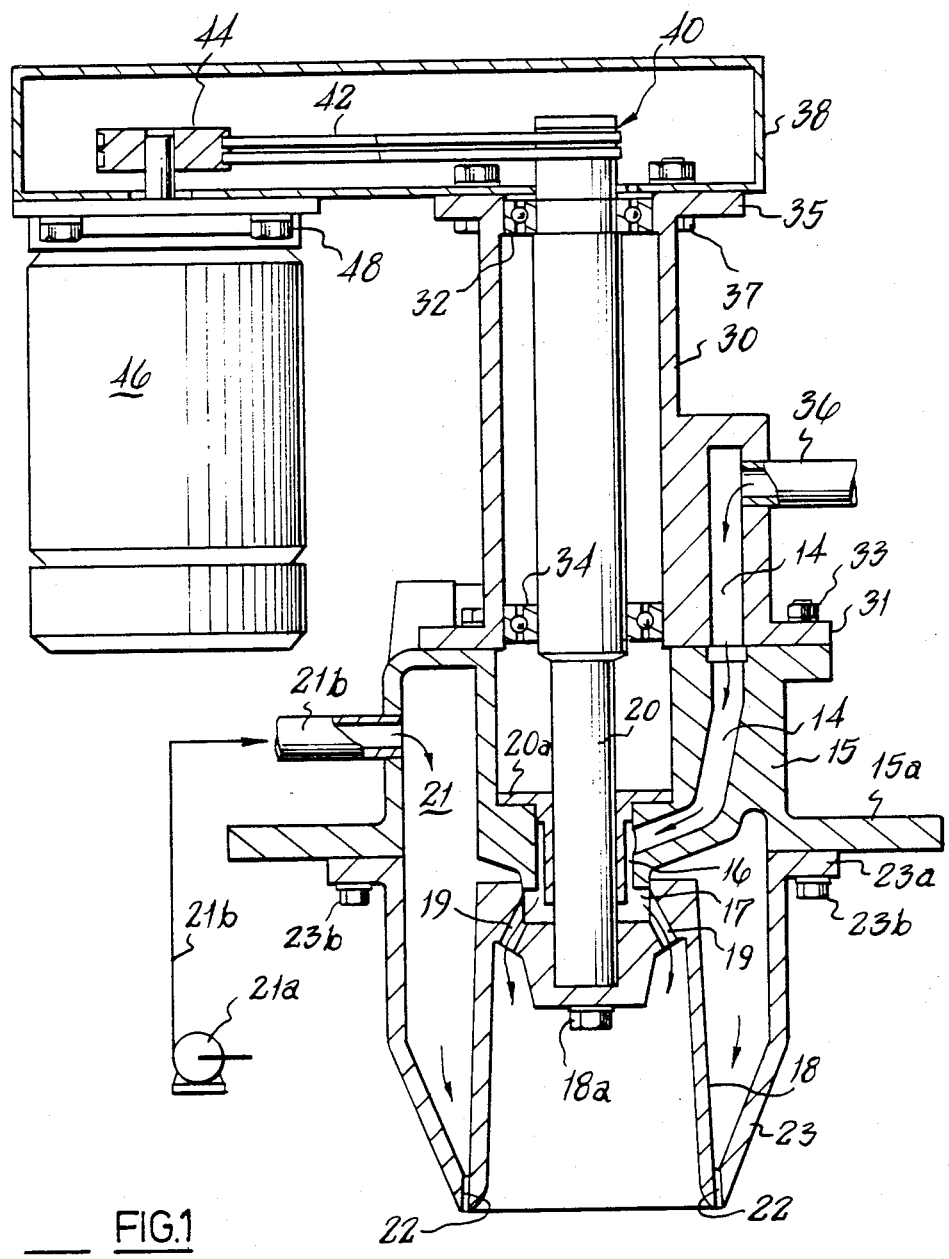
FIG. 1 shows a section through a rotary-cup atomiser.

In the rotary-cup atomiser shown in FIG. 1 a liquid supply path comprises a duct 14 a lower portion of which is defined in a housing element 15, a duct 16, a chamber 17 at the top of an inverted frustoconical rotary up 18, and a plurality of ducts 19. The cup 18 is secured by a retaining screw 18*a* to a shaft 20 for coaxial rotation about a vertical axis with the shaft 20. Air, for example, is supplied through a chamber 21 external to the cup 18 by, for example, a blower 21*a* (shown diagrammatically in FIG. 1) connected to the chamber 21 via a line 21*b*. The air exits the chamber 21 via an annular nozzle aperture 22 defined around the lower rim of the rotary cup 18 and between the cup 18 and a stationary cup shroud 23 which also serves to define an outer wall of the chamber 21.

The shroud 23 is bolted at 23*b* to the housing element 15 via respective flanges 23*a*, and 15*a*. The shaft 20 is mounted in a journal bearing 20*a* in the housing element 15 and extends upwardly into a housing element 30 where it is mounted in axially spaced ball bearings 32,34. The housing element 30 is bolted at 33 to the housing element 15 via a flange 31. An upper portion of the duct 14 is defined in the housing element 30 and a vessel 7 (FIG. 2) is connected to the duct 14 by a line 36 via a pump 8.

An upper end portion of the shaft 20 extends into a belt housing 38 which is bolted at 37 to the housing element 30 via a flange 35. A belt pulley 40 is mounted on the shaft 20 within the housing 38 and a drive belt 42 is tensioned within the housing 38 around the pulley 40 and a drive pulley 44 of an electric motor 46. The electric motor 46 is bolted to the housing 38 at 48.

In operation the cup is rotated by the electric motor at a speed of e.g. about 5,000 r.p.m., and an aqueous suspension of calcium hydroxide is continuously supplied to the interior of the rotating cup 18 via the supply path including the ducts 19 and is distributed around the internal surface of the cup as a thin film. As centrifugal force drives the suspension off the lower end portion of the cup it is atomised by impaction with the high velocity stream of air exiting through aperture 22. This causes instability in the liquid film and results in the production of a spray of fine droplets, which is sprayed into a sulphur dioxide-containing flue gas whereby to absorb sulphur dioxide from the gas. The ambient conditions of the flue gas are such that all the water is evaporated and the absorption product is dried as it is formed.

The conical angle $\alpha$ (FIG. 3) of the spray pattern produced by the cup 18 is primarily controlled by the volumetric flow rate and linear velocity of the air exiting through the annular nozzle aperture 22. The angle of the spray pattern is reduced by increasing the air rate and increased by reducing the air rate. The flow rate of liquid to the cup 18 is adjusted to obtain a uniform film on its interior.

One advantage of a rotating cup atomiser for example is that the main atomisation process apparently takes place by impaction of the air on the liquid when it has left the interior surface of the cup. Only the cup internal surface is exposed to flowing liquid, and then only at relatively low velocities, so that when using e.g. abrasive fly ash/lime, slurries there will be little or no abrasion damage to the atomiser as opposed to the considerable abrasion damage that can occur when centrifugal disc type atomisers are used.

The rotating cup atomiser permits tall towers with optimum gas flow distribution to be used. Tests have shown that with lime slurries the rotating-cup atomiser arrangement can cope satisfactorily with slurry concentrations of up to 40% solids by weight, and fly ash/lime ratios of up to 3:1 by weight.

The size of the spray droplets is controlled by the velocity of the air exiting through the annular nozzle aperture 22, which in turn depends on the pressure of the air in the line 21*b*, a higher pressure resulting in a higher flow rate and smaller droplets. The spray droplet size is controlled to be a practical maximum consistent with maintaining the ambient conditions in the gas for complete evaporation and drying of the absorption product as it is formed. It will be realized that the maintenance of evaporative conditions in the gas depends inter alia on such factors as the flow rate and temperature of the gas, and is readily controlled manually, or automatically integrated with the droplet size control.

The spray droplet size is so controlled that the arithmetical average spray droplet lifetime is at least 80% e.g. 85–95% of the theoretical maximum as measured by the residence time of the gas in the tower.

It will be realized that a high percentage of the solid particles in the suspension should be smaller than the spray droplet size to minimize the risk of free solids in the spray and in any case the efficiency of absorption is promoted by small solid particles.

For example at least 60% (e.g. 75% or more) of the solid particles in the suspension have a diameter not more than 10 microns.

A practical arrangement for desulphurising flue gas from a coal-fired installation is illustrated schematically in FIG. 2. The apparatus shown at 5 for treating the flue gas after a tall thin desulphurising tower 6, may comprise a bag filter or an electro-precipitator. Slurries of slaked lime or limestone are prepared in the vessel 7 and pumped by the pump 8 via the line 36 to a plurality of rotating-cup atomisers 9 at the top of tower 6. The atomisers are as shown in FIG. 1 but for clarity the air supply to the atomisers has not been indicated in FIG. 2. Hot gas, for example boiler flue gas at a temperature between 120° C. and 200° C. containing sulphur dioxide (e.g. 300–3,000 p.p.m. $SO_2$ by volume) is directed to the top of the tower 6 via line 10. Spray drying occurs in the tower 6 as described above upon contact of the hot gas and the atomised absorbent, and dry powder effluent is collected at the bottom of tower 6 and removed via a valve 6*a*. The flue gas then passes via line 10*a* through bag filter or electro-precipitator 5 and further powder effluent and fly ash (including some spent absorbent) is collected in hoppers 12 and removed via valves 12*a*. The substantially desulphurised flue gas is then exited to the atmosphere via a stack 13, which is preceded by a fan 11.

It has been found that with an initial flue gas containing 300–3,000 parts per million and an inlet gas temperature of 160° C. an efficiency of removal of $SO_2$ approaching 90% can be achieved using an arrangement as described with reference to FIGS. 1 and 2 by the combined effect of the tower 6 and a bag filter at 5. With a stoichiometric ratio of $Ca(OH)_2$ to $SO_2$ of 1.0, the efficiency of $SO_2$ removal was about 70%. 70% removal is ample in most circumstances. At a stoichiometric ratio of 1.5, the efficiency increased to the order of 85%.

A preferred stoichiometric range is 0.5 to 2.0.

It is preferred tht the gas exiting the tower 6 at 10a be as close to its dewpoint consistent with maintaining unsaturation at the stack 13; for example 5° to 15° C. above the dewpoint at 10a. It is believed that this enhances the efficiency of absorption in the tower 6 and also of the bag filter if used at 5.

Typically a single tower 6 handles up to 500,000 cubic feet (ambient conditions) per minute of flue gas (14,000 cubic meters per minute), and a 500 Megawatt coal burning power station would require 4 or 5 such towers to handle its entire flue gas effluent.

Figure 4:
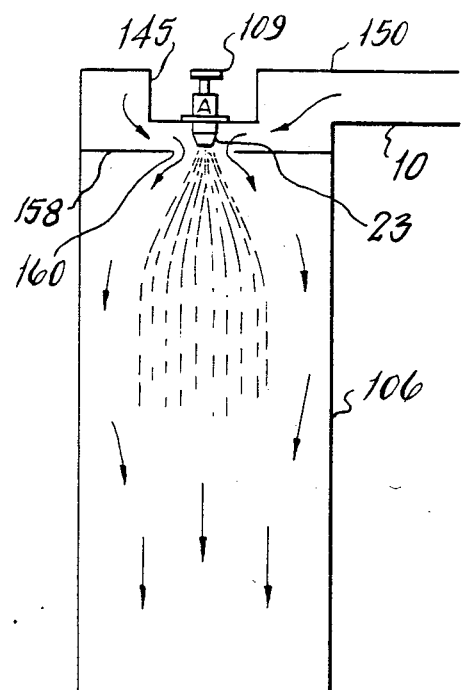
FIG. 4 shows, schematically, a modified form of desulphurisation spray tower.
Figure 3:
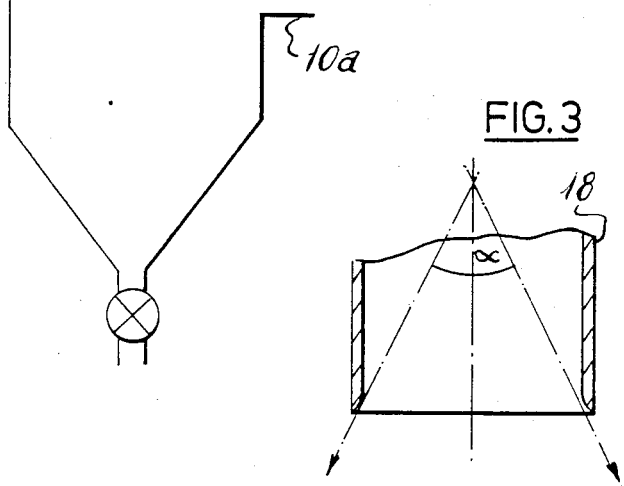
FIG. 3 illustrates a spray pattern angle.
Figure 5:
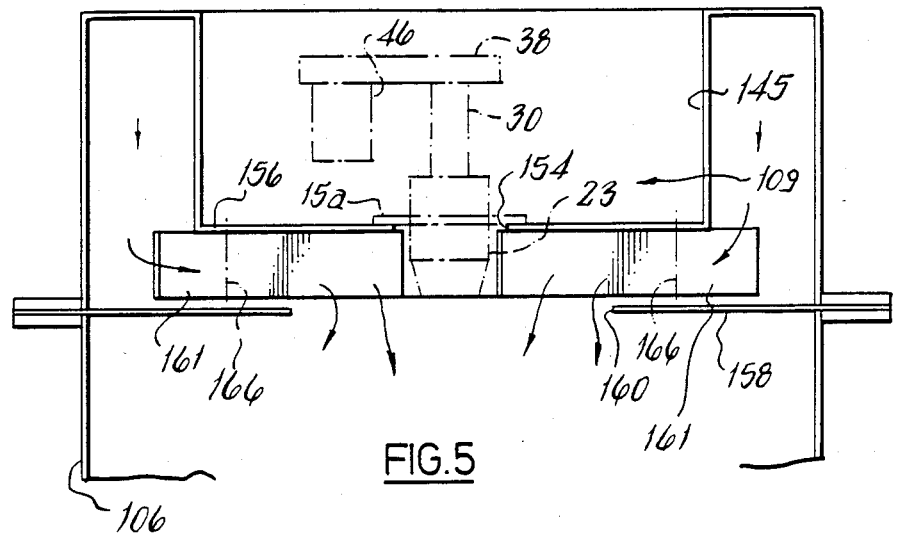
FIG. 5 is an enlarged side view showing gas inlet arrangements of the tower of FIG. 4.
Figure 6:
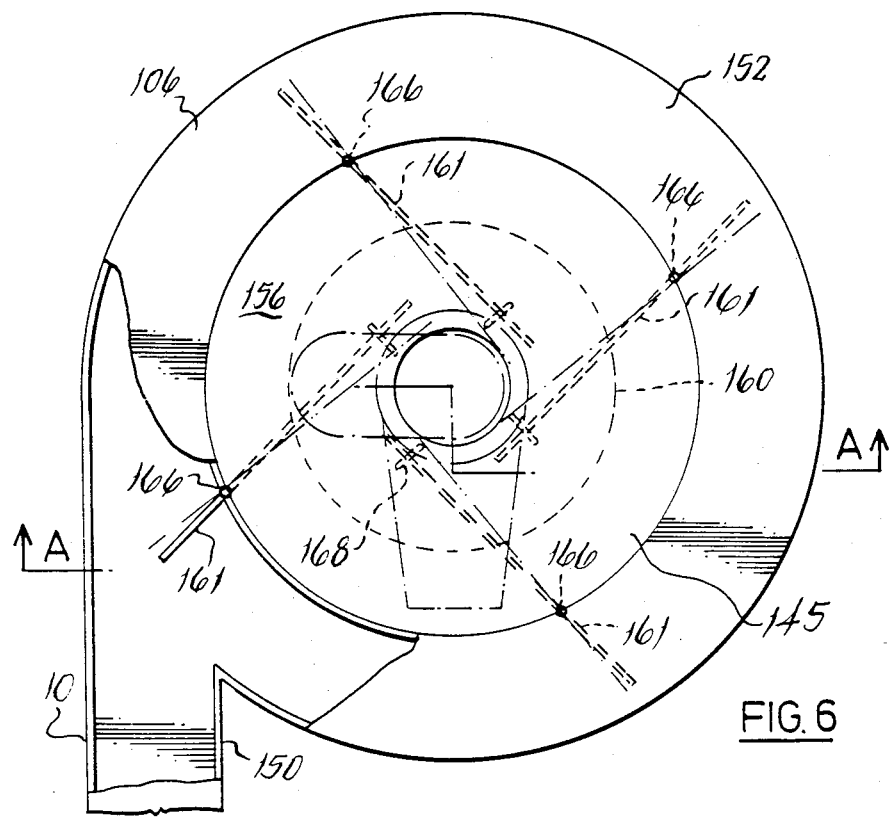
FIG. 6 is a plan view corresponding to FIG. 5.

FIGS. 4, 5 and 6 show at 106 a preferred modified form of the tower 6 designed with a view to optimising uniform gas flow distribution in the tower and minimising the risk of the spray pattern impinging on the wall of the tower, which can lead for example to uncontrolled solids build-up and incomplete evaporation.

In the case of the tower 106 a single rotating cup atomiser 109 (which is again as shown in FIG. 1) is located adjacent the top of the tower 106 axially of the tower; and the line 10 leads to an upper inlet 150 of the tower 106 which is tangential of the tower. The inlet 150 leads tangentially into a circular duct 152 (FIG. 6) which extends continuously circumferentially from the inlet 150 round the tower 106 and returns to its junction with the inlet 150. The atomiser 109 is mounted in a circular well 145 the side wall of which is defined by the annular duct 152. The shroud 23 and cup 18 (FIG. 1) of the atomiser extend through an axial orifice 154 in a base wall 156 of the well 145 so that the cup 18 communicates with the interior of the tower 106; the flange 15a is mounted on the base wall 156 around the orifice 154. An orifice plate 158 is mounted in the tower 106 below and spaced from the shroud 23 and defines a central circular orifice 160.

Four adjustable deflector vanes 161 each lying in a vertical plane are mounted in the space between the base wall 156 and the orifice plate 158, and each deflector vane 161 depthwise extends downwardly from the base wall 156 to a locality spaced from the orifice plate 158 and co-planar with the bottom of the shroud 23. Lengthwise each vane 161 extends from closely adjacent the shroud 23 past the rim of the orifice 154 to a position spaced from the inside periphery of the tower 106. Each vane 161 is adjustable about a vertical pivot 166 which extends downwardly from the base wall 156; the vane 161 is adjustable between the limiting positions indicated in FIG. 6 which are defined by the ends of a slot 168; in an inner limiting position of the vane 161 the vane abuts the shroud 23 tangentially thereof.

In operation each vane 161 directs a proportion of the gas flowing along the duct 152 inwardly towards the axis of the tower 106 and the gas then passes past the atomiser 109 through the orifice 160 into the interior of the tower 106 as indicated by the arrows in the drawings.

In a modification the atomiser or atomisers are located at the bottom of the tower and the gas entry is at the bottom of the tower; in other modifications countercurrent gas/liquid spray flow is used rather than cocurrent. Again in other modifications the tower is oriented with its longitudinal axis horizontal rather than vertical.

Whereas the embodiments of the invention have been described with reference to the use of air as the atomising gaseous medium, it is alternatively possible to use steam or flue gas to be contacted by the liquid film. It may be beneficial to use the flue gas as the atomising gaseous medium, since it avoids the necessity to add a diluent gas with the associated additional gas cleaning capacity following the desulphuriser tower.

COMPARATIVE EXAMPLE A

An aqueous calcium hydroxide slurry was sprayed into a sulphur dioxide-containing gas in a tower using a rotating cup atomiser under conditions such that all the water was evaporated and the absorption product dried as it was formed. The tower was 20 feet (6 meters) tall and 6 feet (1.8 meters) in diameter.

The conditions were as follows:

| | |
|---|---|
| Pressure of atomising air (measured in line 21b immediately prior to chamber 21): | 10.5 lbs./square inch (0.738 kg/cm$^2$) |
| Gas inlet temperature to tower: | 130° C. |
| Gas outlet temperature from tower: | 64° C. |
| Slurry concentration: | varying between 5% and 10% by weight Ca(OH)$_2$ |

A droplet size spectrum is shown graphically in FIG. 7A and this shows about 46% of the droplets having a diameter not less than 30 microns where the droplets are formed by impaction and almost 44% in the range from 30 to 90 microns.

A calcium hydroxide particle size spectrum is shown in FIG. 8 and shows 78.2% not more than 10 microns. A Coulter Counter was used for the particle size analysis.

The results at various stoichiometric ratios are tabulated below:

| Stoichiometric Ratio (Ca(OH)$_2$/SO$_2$) | % Efficiency of SO$_2$ removal |
|---|---|
| 0.7 | 23% |
| 1.25 | 33% |
| 1.8 | 38% |

EXAMPLE I

The procedure of Comparative Example A was followed but with an atomising air pressure of 1.5 lbs. per square inch (0.105 kg/cm$^2$): all other relevant conditions including the calcium hydroxide particle size spectrum were the same as in Comparative Example A.

A droplet size spectrum is shown graphically in FIG. 7B and this shows about 70% not less than 30 microns and about 60% in the range of 30 to 90 microns.

The results are tabulated below:

| Stoichiometric Ratio (Ca(OH)$_2$/SO$_2$) | % Efficiency of SO$_2$ removal |
|---|---|
| 0.7 | 39% |
| 1.25 | 49% |
| 1.8 | 54% |

It will be noted that these efficiencies are not as high as some optimised figures given hereinabove but it will be realized that the high figures are for the combined effect of a spray tower and bag filter and the absorption reaction continues after the spray-tower between the residual $SO_2$ in the gas and unreacted gas-borne $Ca(OH)_2$.

EXAMPLE II

The procedure of Example I was followed at a single stoichiometric ratio of 0.7 with two different pressures of atomising air both of which yielded droplet size spectra with at least 50% in the range of 30 to 90 microns; all other relevant conditions were the same as in Example I.

The results are tabulated below together with corresponding figures from Comparative Example A and Example I.

| Atomising Air Pressure (lbs/sq. inch) | % Efficiency of $SO_2$ removal |
| --- | --- |
| 1.5 (0.105 kg/cm$^2$) | 39% |
| 5.5 (0.386 kg/cm$^2$) | 32% |
| 8.0 (0.562 kg/cm$^2$) | 26% |
| 10.5 (0.738 kg/cm$^2$) | 23% |

COMPARATIVE EXAMPLE B

The procedure of Comparative Example A was followed with an increased gas inlet temperature of 160° C.; all other relevant conditions were the same as in Comparative Example A.

The results at two different stoichiometric ratios are tabulated below:

| Stoichiometric Ratio (Ca(OH)$_2$/SO$_2$) | % Efficiency of $SO_2$ removal |
| --- | --- |
| 0.7 | 36% |
| 1.75 | 55% |

EXAMPLE III

The procedure of Example I was repeated but with an increased gas inlet temperature of 160° C.; all other relevant conditions were the same as in Example I.

The results are tabulated below:

| Stoichiometric Ratio (Ca(OH)$_2$/SO$_2$) | % Efficiency of $SO_2$ removal |
| --- | --- |
| 0.7 | 49% |
| 0.9 | 53% |
| 1.75 | 66% |
| 2.25 | 68% |

EXAMPLE IV

The procedure of Example III was repeated at various stoichiometric ratios but at the single atomising air pressure of 5.5 lbs. per square inch (0.386 kg/cm$^2$); all other relevant conditions were the same as in Example III.

| Stoichiometric Ratio (Ca(OH)$_2$/SO$_2$) | % Efficiency of $SO_2$ removal |
| --- | --- |
| 0.7 | 47% |
| 0.9 | 51% |
| 1.75 | 64% |

EXAMPLE V

In FIG. 9 the horizontal axis shows gas outlet temperature from the tower which was used for the preceding Examples and the vertical axis shows gas residence time in the tower or spray droplet lifetime for the calcium hydroxide slurry sprayed into the tower. The two curves represent at two different atomising pressures the theoretical maximum droplet lifetimes (as measured by the gas residence time in the tower) above which the spray drying conditions are no longer maintained and wetting occurs in the tower. The spread of the two curves illustrates clearly that the larger droplets (corresponding to the lower atomising pressure) have longer lifetimes at a given gas outlet temperature.

The separately plotted points marked X represent practical arithmetical average spray droplet lifetimes below the theoretical maximum and the percentage of the theoretical maximum is indicated on FIG. 9.

It will be realized that for the points marked X below the left hand curve, the actual residence time of the gas in the tower remains on the left hand curve; and similarly for the points X below the right hand curve, the actual residence time remains on that curve. Thus at a fixed gas residence time falling for example on the left hand curve the pressure must be set above the indicated pressure of 0.09 kg/cm$^2$ to reduce the droplet size and hence the droplet lifetime below the curve.

We claim:

1. In a method of absorbing pollutant material comprising sulphur dioxide from a polluted gas containing sulphur dioxide wherein an aqueous suspension of solid absorbent comprising calcium hydroxide or calcium carbonate is sprayed into the gas under ambient conditions in which all the water is evaporated and the absorption product dried as it is formed, the improvement comprising the step of controlling the spray droplet size to be a practical maximum consistent with all said water being evaporated and absorption product dried as it is formed.

2. In a method according to claim 1, wherein the arithmetical average droplet lifetime is at least 85% of the theoretical maximum spray droplet lifetime consistent with all said water being evaporated and absorption product dried as it is formed.

3. In a method according to claim 1, wherein the arithmetical average spray droplet lifetime is at least 80% of the theoretical maximum spray droplet lifetime consistent with all said water being evaporated and absorption product dried as it is formed.

4. In a method according to claim 1 or claim 2, wherein the arithmetical average spray droplet lifetime is at least 90% of the maximum spray droplet lifetime consistent with all said water being evaporated and absorption product dried as it is formed.

5. In a method according to claim 1 or claim 2, wherein the arithmetical average spray droplet lifetime is 85—95% of the theoretical maximum spray droplet lifetime consistent with all said water being evaporated and absorption product dried as it is formed.

6. In a method according to claim 1 or claim 2, wherein the arithmetical average spray droplet lifetime is at least 95% of the maximum spray droplet lifetime consistent with all said water being evaporated and absorption product dried as it is formed.

7. In a method according to claim 1 or claim 2, wherein at least 60% of the solid particles in the suspension have a diameter up to 10 microns.

8. In a method according to claim 1 or claim 2, wherein at least 75% of the solid particles in the suspension have a diameter up to 10 microns.

9. In a method according to claim 1 or claim 2, wherein the concentration of the sulphur dioxide in the polluted gas is 300–3,000 p.p.m. $SO_2$ by volume.

10. In a method according to claim 1 or claim 2, wherein the aqueous suspension has a concentration of up to 40% solids by weight.

11. In a method according to claim 1 or claim 2, wherein the spraying step comprises:
   (i) continuously providing a film of the suspension on an extended surface of a spray device; and
   (ii) impacting the suspension when it has left the surface with a gaseous stream to form the spray droplets.

12. In a method according to claim 11, wherein said surface is provided on the interior of a rotating cup.

13. In a method according to claim 12, wherein the cup is rotated at a speed of 3,000–6,000 r.p.m.

14. In a method according to claim 1 or claim 2, wherein the aqueous suspension is sprayed into the gas in a tower having the capacity to handle a gas flow rate up to 14,000 cubic meters (ambient conditions) per minute.

* * * * *